United States Patent [19]
Beck

[11] 3,811,230
[45] May 21, 1974

[54] FACET GRINDING APPARATUS

[76] Inventor: Alexander Beck, Forrigel CH-8113, Boppelsen, Switzerland

[22] Filed: June 16, 1972

[21] Appl. No.: 263,428

[30] Foreign Application Priority Data
June 30, 1971 Switzerland.......................... 9586/71

[52] U.S. Cl.................................... 51/127, 51/229
[51] Int. Cl............................................. B24b 9/16
[58] Field of Search....................... 51/125, 127, 229

[56] References Cited
UNITED STATES PATENTS
| | | | |
|---|---|---|---|
| 1,461,149 | 7/1923 | Hunt | 51/229 X |
| 2,693,063 | 11/1954 | Dillon | 51/127 |
| 3,439,456 | 4/1969 | Bailey | 51/229 X |

FOREIGN PATENTS OR APPLICATIONS
522,980  4/1955  Italy...................................... 51/127

*Primary Examiner*—Harold D. Whitehead
*Attorney, Agent, or Firm*—Michael S. Striker

[57] ABSTRACT

An apparatus for grinding facets in a workpiece has a parallelogram lever arrangement. The workpiece is mounted on one arm of a parallel set of arms of the lever arrangement, while the other arm of the set is pivotally mounted on a stationary support member. Means are provided for selectively adjusting the angular position of the workpiece about its support arm, and further means are provided for selectively adjusting the angular position of the other parallel arm about the pivot on the support member.

19 Claims, 1 Drawing Figure

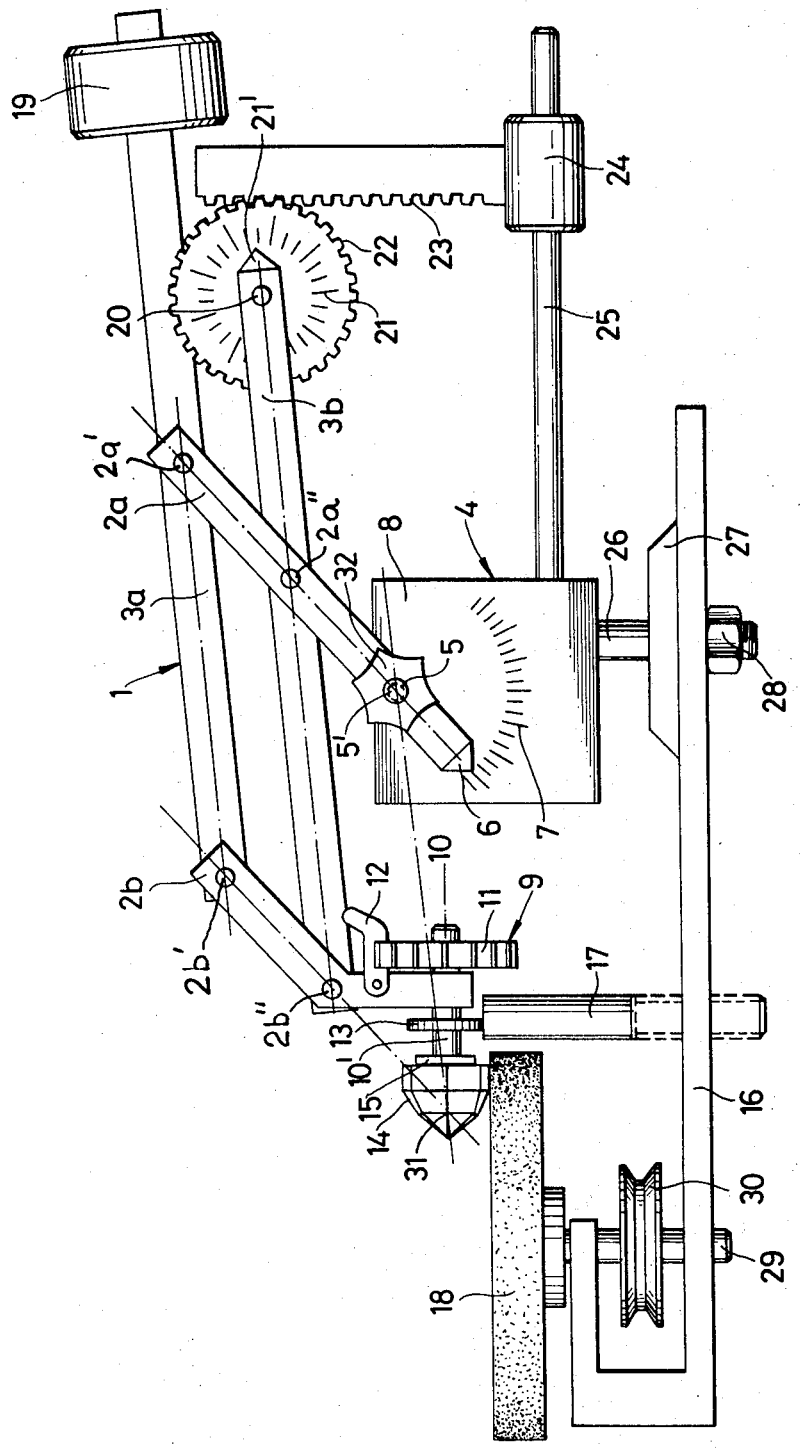

FACET GRINDING APPARATUS

BACKGROUND OF THE INVENTION

The present invention relates to grinding apparatus, and particularly to an apparatus for grinding and polishing facets in precious stones and the like -- the grinding taking place after the stone has been oriented about two mutually perpendicular axes.

Grinding apparatus for grinding facets in precious stones and the like are already known. Such grinding apparatus have been utilized in the gem-cutting industry to grind or cut facets of a stone which is orientable about two mutually perpendicular axes. Most of the prior-art cutting apparatus operate substantially in a similar manner. Thus, the stone to be cut or ground is fixedly held at the end of a shaft whose longitudinal axis coincides with one of the axes about which the stone is to be angularly oriented for cutting or grinding faces angularly displaced about the axis. The stone or gem is pivotally mounted by sticking the same onto the end of a shaft with wax or other suitable cementing or holding means. The other end of the shaft is fixed to a perpendicular shaft about which the first shaft may be swung freely, the axis of the second or perpendicular shaft being identical or coincident with a second axis about which the stone is to be angularly oriented for cutting facets. The axis of the second or perpendicular shaft is parallel to the facet generating plane of the cutting tool, e.g., a grinding wheel, and its distance from the surface of the wheel must be adjusted on a suitable mast or rod to which the first shaft is attached. Most known prior-art devices make use of a distance adjustment for producing the desired angle of inclination of the facets in relation to the first shaft axis. All gem-cutting devices known up to date have the disadvantageous feature that the axes of the first and second shafts must be brought together or must intersect at a point or fixed position in relation to each other during the cutting process. The point of intersection with the prior-art devices typically lies outside of the body to be shaped and the distance between the point of intersection and the body is invariable during the cutting process. These features have created disadvantages which the present invention seeks to solve. Thus, in the prior apparatus the inclination angle of the generated facet in relation to the axes of the second or perpendicular shaft changes continuously with the amount cut off and a corresponding adjustment must be made to maintain the distance between the first shaft axis and the face generating surface of the cutting wheel. Such adjustments also have to be made when necessitated by changing from "coarse" to "fine" cutting wheels and to polishing wheels, since these generally are of different thicknesses and are supported on a shaft on the opposite side of the cutting face. In cases where several facets must be cut in succession with the same inclination angle, but with a different distance from a geometrical point within the stone to be cut, such distance adjustments also have to be made for each new facet. For example, the cutting of the faces of an irregular tetrahedron where three faces must have the same inclination angle to the axis of the second or perpendicular shaft, the fourth face is an irregular triangle perpendicular to this axis, a distance adjustment of the axis of the first shaft must be made each time one of the three faces is cut. The precise cutting angles within such close tolerances requires much skill of the workers handling the cutting apparatus, and becomes quite cumbersome when the first shaft must be slanted at a great angle with respect to the cutting wheel. In addition, all bodies to be shaped with the known devices must be pre-shaped into a form that permits the worker to place the facets in a desired symmetrical array. This means, of course, additional working procedures and higher losses of costly gem material. A particular disadvantage of these devices that bars them from use in semi-conductor industries consists in the fact that the amount of cut-off during shaping procedure cannot be accurately measured or read directly with an instrument.

SUMMARY OF THE INVENTION

Accordingly, it is an object of the present invention to provide an apparatus for grinding facets in a workpiece which does not have the disadvantages of similar apparatus known in the prior art.

Another object of the present invention is to provide an apparatus for grinding facets in a workpiece which is simple in construction and economical to manufacture and which is simple to use while accurately cutting the workpiece.

Still another object of the present invention is to provide a facet grinding apparatus which permits precise cutting of prescious stones and the like with very high accuracy and repeatability.

A further object of the present invention is to provide a grinding apparatus of the type mentioned above which facilitates the shaping of solids, whereby any facet may be cut with reproducable and equal precision for any inclination angle of the generated facet, about two mutually perpendicular axes.

It is still a further object of the present invention to provide an apparatus under discussion which permits the angular adjustment of the workpiece to be cut over a space angle of 180° about one axes and which reduces working time by simplifying the working procedures and allowing direct reading of the amount cut off during shaping by means of coupled measuring devices.

In order to achieve the above objects, as well as others which will become apparent hereafter, the present apparatus for grinding facets in a workpiece comprises a stationary mounting structure. A parallelogram lever arrangement is provided which has two sets of parallel arms pivotally connected to each other about respective parallel lever pivot axes, one of said sets of arms having first and second arms. The first arm of said one set is mounted on said mounting structure pivotally about a first pivot axis substantially parallel to said lever pivot axes. A workpiece holding means is provided which is mounted on said second arm adjustable about a second pivot axis substantially normal to said first pivot axis. First means are provided for fixing the position of said first arm in any selected angular position about said first pivot axis, and second means are provided for fixing the position of said workpiece holding means in any selected angular position about said second pivot axis. Grinding means are provided which has a grinding face for grinding the workpiece in thus adjusted positions about said first and second axes.

According to a presently preferred embodiment, said first arm has an extended portion which extends beyond a respective lever pivot axis of said first arm, and wherein said extended portion is pivotally mounted on said stationary support member about said first pivot axis. Also, said second arm has an extended portion which extends beyond a respective lever pivot axis of said second arm, said extended portion being bent towards said first arm to form an angle with a plane passing through the two respective lever pivot axes of the said second arm. Said workpiece holding means is adapted to hold a workpiece, and wherein a line passing through the respective lever point axis of said second arm and a line passing through said first pivot axis and parallel to the other set of parallel arms intersect within the workpiece.

The novel features which are considered as characteristic of the invention are set forth in particular in the appended claims. The invention itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a front elevational view of the apparatus for grinding facets in accordance with the present invention, shown adjusted to grind a facet of a stone.

DESCRIPTION OF THE PREFERRED EMBODIMENTS

Referring now to the drawing, the grinding apparatus in accordance with the present invention has a parallelogram lever arrangement 1 which comprises a first pair or set of parallel arms 2a and 2b, and a second pair or set of parallel arms 3a and 3b. The various arms are pivotally connected to each other by means of lever pivots 2a', 2b', 2a" and 2b" which have axes substantially parallel to each other and perpendicular to the plane of the drawing.

A first angular positioning means 4 includes a pin 5 having a first pivot axis 5' which is substantially parallel to the lever pivot axes. According to the presently preferred embodiment, the arm 2a has an extension which extends beyond the lever pivot 2a" -- the extension being pivotally mounted about the pin 5 for pivotal movement about the first pivot axis 5'. The extension of the arm 2a is provided with an index for accurately adjusting the first angular position of the stone as will hereafter be described, the index 6 cooperating with a scale 7 which is fixed on a support block 8. The pin 5 is mounted on the support block 8.

Although the arm 2a has been described as being mounted on the pin 5 on a portion of its extension, it is also possible, as will hereafter become clear, to pivotally mount the arm 2a at either one of the lever pivots 2a' or 2a" or at a point of the lever arm 2a intermediate said two lever pivots.

The first angular positioning means 4 is attached to the parallelogram lever arrangement 1 in such a way that the arm 2a may be rotated about the first pivot axis 5' within a sector of 90 angular degrees and may be locked in any position by tightening the locking nut 32 screwed onto a threaded free end of the pin 5 to thereby increase the friction between the arm 2a and the support block 8.

The arm 2b has an extension which extends beyond the lever pivot 2b". The second angular positioning means 9 comprises a shaft 10' which has an axis 10 which is substantially perpendicular to the first pivot axis 5'. The workpiece is arranged to be angularly adjusted about the second pivot axis 10, as will hereafter be described.

The second angular positioning means 9 further comprises a notched scale plate 11 which is firmly attached to the shaft 10'. A lever 12 pivotally mounted on the extension of the arm 2b is arranged to engage a particular notch of the notched scale plate 11 to fix a selected angular orientation of the scale 11 about the second pivot axis 10. Once the lever 12 has so engaged the scale 11, the latter can no longer rotate and is fixed about the second pivot axis 10 -- this being the condition once cutting of a facet has commenced. The lever 12 further acts or functions as an index to indicate the angular position on the notched scale 11 to which the workpiece is adjusted about the second pivot axis 10. By utilizing such a second angular positioning means 9, and selecting the spacing between adjacent notches in the notched scale plate 11, it is possible to select and fixedly hold the position of the workpiece in any of a plurality of angular positions about the second pivot axis 10.

In accordance with the presently preferred embodiment, bearing means are provided on the extension of the arm 2b, which bearing means rotatably supports the shaft 10' so as to facilitate the rotation of the latter about the second pivot axis 10.

A template 13, selected to regulate the amounts to be ground off from a workpiece 14, is firmly attached to the shaft 10' and is arranged coaxially therewith so that the axis of the template 13 substantially coincides with the second pivot axis 10. A working piece holder 15 is provided at the end of the shaft 10' which is adapted to firmly hold the workpiece 14 in a conventional manner.

The template 13 is shown to be circular, but the peripheral outline of the template is not a critical feature of the present invention. Accordingly, any peripheral outline which is suitable for a particular application may be utilized. Generally, the edge or peripheral outline of the template 13 has a shape to determine the desired peripheral outline or "girdle" of the working piece 14 by determining the distance of the centre of the working piece 14 from the grinding surface of the grinding wheel 18 in any rotational position about the second pivot axis 10. Generally, the faces which are successively formed by the rotation of the scale 11 about the second pivot axis 10 are faces which are angularly displaced about the second pivot axis 10. For the common situation where the faces are successively and symmetrically formed about the second pivot axis 10 e.g., in a brilliant cut, the template 13 simply comprises a round disk.

Below the template 13, there is provided a reference peg 17 which is axially adjustable on a base plate 16 and has a flat free end that is parallel to the cutting face of a grinding wheel 18. For shaping the outline of a workpiece 14 into a desired form, it is ground all around, i.e., along peripheral portions which are coaxial with the second pivot axis 10, on the grinding wheel 18 by successively turning the shaft 10' and or bringing the shaft into preselected angular positions by means of the second angular positioning means 9. The faces about such peripheral portions on the workpiece 14 are ground or cut until the rim of the template 13 rests, in all the rotational positions, on the flat free end of the reference peg 17. The second angular positioning means 9 is attached or mounted on the bent arm or extension of the arm 2b which constitutes, together with the arm 2a, a first pair or set of parallelogram arms.

The second pair or set of parallelogram arms is constituted by the arms 3a and 3b, as described above. The arm 3a has an extended portion which extends beyond the lever pivot 2a'. A counterweight 19 is slidably mounted on the extension or extended portion of the arm 3a. The arm 3b is similarly provided with an extended portion which extends beyond the lever pivot 2a''. A measuring device is firmly attached to this latter extended portion for giving an indication of the extent to which any one face has been ground, i.e., the extent to which the lower peripheral portion of the template 13 has moved towards the top flat free face of the reference peg 17. The measuring device consists of a pivot 20 fixed to the extended portion of the arm 3b on which a circular scale 21 is mounted. The circular scale 21 is rotatable about the pivot 20, as will hereafter be described. The spur gear 22 meshes with rack 23 which is firmly attached with one end to a bushing 24. The extended portion of the arm 3b is provided with a reading index 21' at the end thereof which is arranged to point to the markings on the circular scale 21. The bushing 24 is shiftable or slidably mounted on a reference rod 25 which is firmly attached to the support block 8. The support block 8 rests with a bearing on the upper end of a rod 26 around which it may be rotated. The lower end of the rod 26 is threaded and protrudes through a base block 27 to which it is firmly attached. The threaded end of the rod 26 reaches through a slot (not shown) in the base plate 16 and is rigidly fixed thereto by a nut 28 by which the rod 26 may be fixed in a desired position on the base plate 16 closer or further away from the grinding wheel shaft 29. The grinding wheel shaft is mounted on the base plate 16 for rotation about its axis. Bearings (not shown) may advantageously be provided at the points where the grinding wheel shaft 29 is rotatably mounted in the base plate 16 to reduce friction during rotation of the shaft.

The grinding wheel 18 is mounted on the upper free end of the grinding wheel shaft 29, to share the rotation of the shaft 29 about the axis of the latter. Below the grinding wheel 18, a V-belt pulley 30 is mounted coaxially on the grinding wheel shaft 29 and firmly attached to the latter. A V-belt engages the V-belt pulley 30 (not shown) -- this forming part of a driving means which is well known in the art. Advantageously, the belt pulley 30 is driven by a motor providing the necessary power transmission for rotation of the grinding wheel 18. The rod 26 as well as the grinding wheel shaft 29 are substantially perpendicular to the base plate 16 whereby the plane cutting face of the cutting wheel 18, under operating conditions, is substantially parallel to the base plate 16.

The operation of the apparatus will now be described. To begin cutting a face or a facet on a workpiece, the lever arm 2a is adjusted so that the index 6 is opposite a desired marking on the scale 7. This adjusts the angular position of the axis 10 with regard to the upper surface of the grinding wheel 18. Once the angular position of the arm 2a has been properly adjusted to a selected position, the locking nut 32 is tightened so as to maintain the arm 2a in the adjusted position. Once the position of the arm 2a has been fixed, the position of the lever pivots 2a' and 2a'' is likewise fixed. Arm 3a may pivot about the lever pivot 2a' while the arm 3b may pivot about the lever arm 2a''. By pivoting the arms 3a and 3b in a clockwise direction about respective lever pivots 2a' and 2a'', the working piece holder 15 is accordingly raised above the grinding wheel 18 and a working piece 14 may be mounted thereon in a conventional manner. The angular position about the second pivot axis 10 of the face to be cut may now be adjusted by rotating the scale 11 of the second angular positioning means 9 about the second pivot axis 10, and locking that position by engaging the lever 12 into a respective notch in the scale 11. Now that the two angular orientations of the working piece 14 have been selectively adjusted -- by an adjustment of the first and second angular positioning means -- the reference peg 17 may be adjusted to a hight which will determine how much will be cut off at the particular face or regulate the size the facet. The reference peg is now fixed relative to the base plate 16 and is normally maintained in the selected position until one entire set of facets about the second pivot axis 10 has been cut. Before the cutting is ready to commence, the scale 21 is rotated to an initial reference position -- as indicated by the index 21' -- and the bushing 24 is advanced towards the spur gear 22 in order to mesh therewith once the workpiece 14 makes contact with the top surface of the grinding wheel 18. Because the amounts cut off are typically very small, the extent of movement of the spur gear 22 along the rack 23 is small and therefore the two members remain in mesh with one another during the cutting process. Also, it is advantageous to make the spur gear 22 and the rack 23 out of mutually attractive magnetic material or to provide a simple mechanical means (not shown) so that the rack 23 with the bushing 24 may glide on rod 25, somewhat towards and away from the stationary block 8 as the pivot 20 sweeps a circular arc about the lever pivot 2a''. Because of the small amounts which are cut at any particular facet, this movement will be very small.

During actual cutting of the working piece, it will be noted that the counterweight 19 will tend to rotate the arm 3a about the lever pivot 2a' in a clockwise direction. The counterweight 19 has the effect of counterbalancing the overweight of the parallelogram lever arrangement to the left of the arm 2a on the drawing. Thus, shifting the counterweight 19 from the point of balance towards the pivot 2a' it urges the lever 2b to translate in a counterclockwise direction, to thereby effectively move the template 13 closer towards the reference peg 17. This tendency, before the template 13 engages with reference peg 17, results in a downward pressure being applied by the working piece 14 against the upper surface of the grinding wheel 18. This assures engagement for the cutting or grinding process -- the further to the left, as viewed in the FIGURE, the counter weight is moved, the greater will be the pressure with which the working piece 14 abuts against the grinding wheel 18. As the arms 3a and 3b simultaneously rotate about the respective lever pivots 2a' and 2a'', during actual cutting of a facet on the working piece 14, the reading index 21' moves in an upward direction while the circular scale 21 together with the spur gear 22, meshed with the rack 23, rotates in a clockwise direction. This gives a continuous reading of the amount of cutting which has taken place.

According to a presently preferred embodiment, the second angular positioning means 9 is mounted on an extension of the arm 2b described above. The extension of this arm is bent towards the arm 2a to form an angle of between 10° and 80° in relation to a plane passing through the lever pivots 2b' and 2b''. However, such construction is not to be construed to limit the present invention since the second angular positioning means 9 can equally well be mounted on the end of the arm 2b.

It can be seen from the apparatus as shown in the FIGURE, that a plane passing through the lever pivots 2b' and 2b'' (shown in dot-dash line) and a straight line (shown in dot-dash line) passing through the first pivot axis 5' and parallel to the arms 3a and 3b intersect at a point 31. An advantageous feature of the present invention is obtained by positioning the shaft 10' coaxially with the second pivot axis 10, allowing the workpiece 14 to be mounted on the shaft 10 in such a way that the point 31 is located within the workpiece along the axis thereof about which the facets to be ground are angularly displaced. A straight line through the point 31 and parallel to the other parallogram pivot axes, which are oriented perpendicularly to the plane of the drawing, corresponds to a hypothetical geometrical axis of rotation or lever pivot of the arm 2b, were the extension of the arm 2b to be in the same plane as the arm itself. Accordingly, rotation of the arm 2a around the first pivot axis 5' causes a rotation of the arm 2b around the hypothetical axis passing through the point 31 and, therefore, results in a rotation of the workpiece around that corresponding axis through the point 31.

A different version of the design of the measuring device (not shown) for measuring the amount cut off may comprise a position on the pinion meshing with the rack 23 cooperating with a stationary circular scale about the pivot 20.

It will be understood that each of the elements described above, or two or more together, may also find a useful application in other types of a grinding or shaping apparatus differing from the types described above.

While the invention has been illustrated and described as embodied in apparatus for grinding facets in a workpiece it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent Patent is set forth in the appended claims.

I claim:

1. Apparatus for shaping facets in a workpiece comprising a mounting structure; a parallelogram lever arrangement having two sets of parallel movable arms pivotally connected to each other about respective parallel lever pivot axes, one of said sets of arms having first and second arms, said first arm being mounted on said mounting structure pivotably about a first pivot axis substantially parallel to said lever pivot axes; workpiece holding means mounted on said second arm pivotally about a second pivot axis substantially normal to said first pivot axis; first means for fixing the position of said first arm in any selected angular position about said first pivot axis; second means for fixing the position of said workpiece holding means in any selected angular position about said second pivot axis; and shaping means having a shaping face for shaping the workpiece in positions adjusted about said first and second axes.

2. An apparatus as defined in claim 1, wherein said first arm has an extended portion which extends beyond a respective lever pivot axis of said first arm, and wherein said extended portion is pivotally mounted on said support member about said first pivot axis.

3. An apparatus as defined in claim 1, wherein said first pivot axis coincides with the respective lever pivot axis of said first arm.

4. An apparatus as defined in claim 1, wherein said first point axis is located intermediate the two respective lever pivot axes of said first arm.

5. An apparatus as defined in claim 1, wherein said second arm has an extended portion which extends beyond a respective lever pivot axis of said second arm, said extended portion being bent towards said first arm to form an angle with a plane passing through the two respective lever pivot axes of said second arm.

6. An apparatus as defined in claim 5, wherein the angle formed between said extended portion and said plane is between 10° and 80°.

7. An apparatus as defined in claim 5, wherein said workpiece holding means is mounted on said extended portion.

8. An apparatus as defined in claim 7, further comprising bearing means on said extended portion for reducing friction during rotation of said workpiece holding means about said second pivot axis.

9. An apparatus as defined in claim 5, wherein said workpiece holding means is adapted to hold a workpiece, and wherein a plane passing through the lever pivot axes of said second arm and a line passing perpendicularly through said first pivot axis and parallel to the other set of parallel arms intersect within the workpiece.

10. An apparatus as defined in claim 1, wherein said workpiece holding means is adapted to hold a workpiece, and wherein said second pivot axis and a plane passing through the respective lever pivot axes of said second arm intersect within the workpiece.

11. An apparatus as defined in claim 1, further comprising a base plate; a rod extending from said base plate and supportingly connected to said stationary mounting structures, said first pivot axis being parallel to a plane defined by said base plate.

12. An apparatus as defined in claim 11, wherein said workpiece holding means comprises a shaft extending along said second pivot axis, a template firmly mounted on said shaft for sharing the rotation of the latter, and a reference peg adjustably mounted on said base plate for axial movement to a selectable position closer and further from said baseplate, said reference peg having a flat reference surface at the end thereof facing said template for engagement with the latter to thereby prevent movement of said workpiece holding means towards said base plate beyond an amount determined by said reference peg.

13. An apparatus as defined in claim 1, wherein the other set of said sets of arms has third and fourth parallel arms, said third arm having an extended portion which extends beyond a respective lever pivot axis of said third arm; and further comprising a counter-weight slidably mounted on said extended portion.

14. An apparatus as defined in claim 13, wherein said fourth arm has an extended portion which extends beyond a respective lever pivot axis of said fourth arm; and further comprising measuring means connected to the last mentioned extended portion for measuring the extent of rotation of said fourth arm about the last mentioned lever pivot axis.

15. An apparatus as defined in claim 14, wherein said measuring means comprises a pivot on said last mentioned extended portion, a spur gear rotatably mounted on said pivot; and a stationary gear rack extending in a direction substantially normal to that of said shaping face and arranged to mesh with said spur gear.

16. An apparatus as defined in claim 15, further comprising a rod supported by said stationary mounting structure and extending in a direction substantially parallel to said shaping face, a bushing slidably mounted on said rod, said gear rack being connected to said bushing for sharing the movements of the latter along said rod.

17. An apparatus as defined in claim 15, wherein said spur gear has a lateral face provided with scale markings, said last mentioned extended portion including pointer means for indicating the extent to which said spur gear has rotated.

18. An apparatus as defined in claim 1, wherein said first means comprises a locking nut arrangement.

19. An apparatus as defined in claim 1, wherein said workpiece holding means includes a shaft, and said second means comprises a disc axially mounted on said shaft and having graduated notches in its periphery, and a lever pivotably mounted on said second arm for releasably engaging said disc in one of said notches to prevent rotation of said disc and said shaft about said second pivot axis.

* * * * *